United States Patent
Iu et al.

(10) Patent No.: US 6,648,462 B2
(45) Date of Patent: Nov. 18, 2003

(54) PHOTO-INDUCED CRASHING OF INK-JET INK COMPOSITIONS

(75) Inventors: Kai Kong Iu, San Diego, CA (US); Rodney D. Stramel, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/124,539

(22) Filed: Apr. 16, 2002

(65) Prior Publication Data

US 2003/0197768 A1 Oct. 23, 2003

(51) Int. Cl.[7] .............................. B41J 2/01; B41J 2/17
(52) U.S. Cl. ...................... 347/96; 347/101; 347/102; 347/100
(58) Field of Search ................. 347/100, 101, 347/102, 96, 95; 106/31.13, 31.6, 31.27, 31.28

(56) References Cited

U.S. PATENT DOCUMENTS

| 4,138,255 A | | 2/1979 | Crivello | |
|---|---|---|---|---|
| 5,085,698 A | | 2/1992 | Ma et al. | |
| 5,658,964 A | * | 8/1997 | Amon et al. | 522/100 |
| 6,092,890 A | * | 7/2000 | Wen et al. | 347/101 |
| 6,232,361 B1 | * | 5/2001 | Laksin et al. | 106/31.6 |

OTHER PUBLICATIONS

James V. Crivello, Advanced Curing Technologies Using Photo–and Electron Beam Induced Cationic Polymerization, Dept. of Chemistry, Rensselaer Polytechnic Institute.

E.W. Nelson, T.P. Carter, A.B. Scranton, Fluorescence Monitoring of Cationic Photopolymerizations: Divinyl Ether Polymerizations Photosensitized by Anthracene Derivatives, Dept. of Chemical Engineering, Laser Laboratory, Dept. of Chemistry, Michigan State University.

\* cited by examiner

*Primary Examiner*—Stephen D. Meier
*Assistant Examiner*—Manish Shah

(57) ABSTRACT

The present invention is drawn to ink-jet ink compositions, methods, and systems for increasing the bleed and smear fastness and optical density of a printed image. Specifically, an aqueous ink-jettable ink composition is disclosed which exhibits a decrease in pH upon exposure to radiation, followed by precipitation of the ink colorant. The composition can include an ink vehicle, an effective amount of an ink colorant having pH dependent solubility properties, and an effective amount of a photo-initiated acid generator. The method includes the steps of formulating the composition, jetting the ink composition from an ink-jet pen onto a substrate, and exposing the ink-jetted ink on the substrate to radiation wherein the ink-jet ink composition exhibits reduced pH, followed by precipitation of the colorant. Additionally, the system can include an ink-jet ink pen containing the ink-jettable ink composition, a substrate configured for accepting a printed image from the ink-jet pen, and an energy source configured for irradiating the printed image such that a decrease in pH is realized resulting in precipitation of the ink colorant.

36 Claims, No Drawings

PHOTO-INDUCED CRASHING OF INK-JET INK COMPOSITIONS

FIELD OF THE INVENTION

The present invention is directed to aqueous ink-jet ink compositions exhibiting rapidly reduced pH as well as increased viscosity and precipitation of an ink colorant following exposure of the ink composition to a radiation source.

BACKGROUND OF THE INVENTION

Computer printer technology has evolved to a point where very high-resolution images can be transferred to various types of media, including paper. One particular type of printing (referred to generally as ink-jet printing) involves the placement of small drops of fluid ink onto a media surface in response to a digital signal. Typically, the fluid ink is placed or jetted onto the surface without physical contact between the printing device and the surface. Low cost and high quality of the output have made ink-jet printing a popular alternative to other computer related forms of printing.

However, even though great improvement in ink-jet printing has been made, along with this improvement, demand for even higher quality ink-jet printing systems has arisen. These needs include higher speed, higher resolution, full color image formation, reduced color-to-color bleed, more precise dot placement, etc. As such, there are several characteristics to consider when evaluating a printer ink. Such characteristics include its ability to print with good edge acuity and optical density, dry time of the ink on the substrate, adhesion of the ink to the substrate, lack of deviation of the ink droplets in flight, resistance of the ink after drying to water and other solvents, long-term storage stability, and long-term reliability without corrosion to the nozzle or clogging. Though the above list of characteristics provides a worthy goal to seek or strive after, difficulties arise in attempting to satisfy all of the above characteristics. Often, a formulation of an ink-jet ink represents a balancing act between improving on one of the above characteristics at the cost of another. Thus, most commercial inks for use in ink-jet printing represent a series of compromises, made in an attempt to achieve at least an adequate response in meeting all of the above listed ink requirements. Additionally, and of particular importance to the present invention, the optimal rheological characteristics of ink-jet inks (and most forms of ink generally) in their latent forms differ from the optimal rheological characteristics of ink-jet inks in their applied forms. This is because ink-jet inks in their latent form must perform well under the extreme physical stresses imposed during the jetting process, while ink-jet inks in their applied form must adhere quickly and remain static. Therefore, ink-jet ink compositions and application methods that are capable of achieving desired rheology in both the latent and applied form are currently the focus of much research.

Similar needs to improve latent and applied ink rheology and generally increase production rates and print quality in the printing industry have lead to a recent surge in the use of radiation initiated photo-polymerization in a variety of printing processes. These processes typically use ink compositions containing a pre-polymer such as unsaturated alkyl chains, epoxy resins, epoxy monomers, or the like, and a catalyst in the form of a diarylsulfonium or triarylsulfonium salt, which can initiate cationic polymerization of the pre-polymer upon exposure to radiation. The cationic polymerization of the pre-polymers contained in these inks can be initiated by an irreversible photo-fragmentation that occurs in the diarylsulfonium and triarylsulfonium salt compounds upon exposure to radiation. This photo-fragmentation process causes the onium salt photo-initiated catalysts to produce, in situ, a BrØnsted Acid, capable of initiating cationic polymerization. The resultant polymerization of the pre-polymers contained in these inks substantially improves print quality and applied ink rheology by increasing ink viscosity (a quality of fluid that prevents the fluid from flowing when subjected to a force), which in turn increases adherence to the substrate along with smear and water fastness.

However, until the present invention, the use of a photo-initiated acid generator, such as an onium salt, has been impractical for use with ink-jet inks, as the inclusion of pre-polymers typically increase the latent viscosity of an ink-jet ink composition such that it becomes substantially difficult to jet from an ink-jet pen.

SUMMARY OF THE INVENTION

It has been recognized that it would be advantageous to develop an ink-jettable ink composition containing a photo-initiated acid generator such that the ink compositions exhibits effective latent rheology and improved applied rheological ink characteristics. This has been accomplished in part because of the absence of pre-polymers used in the prior art, as the photo-initiated compositions used with the present invention provide a different function. Particularly, the ink-jet inks of the present invention can have low initial viscosity such that the ink is readily ink-jettable, and upon exposure to radiation, a rapid drop in pH occurs. This change in pH can rapidly increase the viscosity and ink adherence upon the substrate, which in turn, can improve print quality. Thus, the invention provides compositions, methods, and systems for printing images exhibiting improved print quality, by exposing the above-mentioned ink to a radiation source subsequent to deposition upon the substrate.

Specifically, an ink-jettable ink composition can comprise an effective amount of an ink vehicle; an effective amount of an ink colorant having solubility properties that are pH dependent; and an effective amount of a photo-initiated acid generator, wherein the composition exhibits a decrease in pH upon exposure to an effective amount of radiation, followed by precipitation of the ink colorant.

Further, a method of printing an image on a substrate with increased print quality, water and smear fastness, and optical density can comprise the steps of formulating an ink-jettable ink composition comprising an effective amount of an ink vehicle, an effective amount of an ink colorant having solubility properties that are pH dependent, and an effective amount of a photo-initiated acid generator, wherein the composition exhibits a decrease in pH upon exposure to an effective amount of radiation, followed by precipitation of the ink colorant; jetting the ink composition from an ink-jet pen onto a substrate; and exposing the ink-jetted ink on the substrate to radiation wherein the ink-jet ink composition exhibits reduced pH followed by precipitation of the colorant.

Additionally, a system for printing an image on a substrate with increased ink efficiency can comprise an ink-jet ink pen containing an ink-jettable ink composition comprising an effective amount of an ink vehicle, an effective amount of an ink colorant having solubility properties that are pH dependent, and an effective amount of a photo-initiated acid generator, wherein the composition exhibits a decrease in pH upon exposure to radiation, followed by precipitation of the ink colorant; a substrate configured for accepting a printed image from the ink-jet pen; and an energy source configured for irradiating the printed image such that a decrease in pH is realized resulting in precipitation of the ink colorant.

Additional features and advantages of the invention will be apparent from the detailed description that follows taken in conjunction with the examples, which together illustrate, the features of the invention.

DETAILED DESCRIPTION OF THE INVENTION

The invention is embodied in an ink-jettable ink exhibiting effective latent rheology, as well as increased viscosity and the precipitation of the ink colorant upon a substrate following exposure of the ink to a radiation source.

Before the present invention is disclosed and described more fully, it is to be understood that this invention is not limited to the particular process steps and materials disclosed herein because such process steps and materials may vary somewhat. It is also to be understood that the terminology used herein is used for the purpose of describing particular embodiments only. The terms are not to be limiting because the scope of the present invention is intended to be limited only by the appended claims and equivalents thereof.

In describing and claiming the present invention, the following terminology will be used.

The singular forms "a," "an," and, "the" include plural referents unless the context clearly dictates otherwise. Thus, for example, reference to "a dye" includes reference to one or more of such dyes, reference to "an ink" includes reference to one or more of such inks, and reference to "the color" includes reference to one or more of such colors.

As used herein, "effective amount" refers to the minimal amount of a substance, agent, or energy sufficient to achieve a desired effect. For example, an effective amount of an "ink vehicle" is the minimum amount required in order to create ink, which will meet the specified performance and characteristic standards. Additionally, the minimum amount of an "ink colorant" would be the minimum amount, which can still achieve the specified performance and characteristic standards.

As used herein, "ink vehicle," refers to the vehicle in which a dye is placed to form ink. Ink vehicles are well known in the art, and a wide variety of ink vehicles may be used to form ink compositions, which are useful in the present invention. Such ink vehicles may include a mixture of a variety of different agents, including without limitation, solvents, co-solvents, buffers, biocides, viscosity modifiers, surface-active agents, and water.

The terms "formulation" and "composition" may be used interchangeably herein. The terms "print media," "print surface," and "substrate" may be used interchangeably herein, and refer to a surface to which ink is applied in order to form an image.

"Radiation" includes any energy, when applied at an effective amount, that produces a drop in pH within an ink-jet ink in accordance with the principles of the present invention.

Concentrations, amounts, and other numerical data may be expressed or presented herein in a range format. It is to be understood that such a range is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

With this in mind, an ink-jettable ink is disclosed having an ink-jettable viscosity in its latent form, and that exhibits reduced pH followed by increased viscosity and the precipitation of the ink colorant upon the substrate following exposure of the ink composition to radiation. The composition comprises an effective amount of an ink vehicle; an effective amount of an ink colorant having solubility properties that are pH dependent; and an effective amount of a photo-initiated acid generator, wherein the composition exhibits a decrease in pH upon exposure to radiation, followed by precipitation of the ink colorant. In one embodiment, the ink composition can comprise at least 22% water by weight.

After the pH is decreased, i.e., acidified, a momentary increase in viscosity can occur prior to precipitation. Regarding pH, in one embodiment, the ink vehicle exhibits an initial pH of about 9.2 and a pH of about 2.9 immediately following exposure to an effective amount of radiation. However, in a more general sense, a pH from about 7 to 13 initially can change to a pH from about 2 to 6 after exposure to the radiation, depending on the selection and amount of ink colorant and photo-initiated acid generator used. For example, the photo-initiated acid generator can be a BrØnsted acid generator or a Lewis acid generator. If it is a BØnsted acid generator, the composition used can be selected from the group consisting of an onium salt and an iodonium salt. If it is a Lewis acid generator, a ferrocenium salt can be used. However, most preferred is the use of arylonium salts such as, for example, a triarylsulfonium salt. In one embodiment, the ink-jet ink composition can comprise from 0.05% to 4% solids by weight of the ink colorant, and from about 0.1% to 13% by weight of the photo-initiated acid generator.

As mentioned previously, the formulation of ink-jet inks present a unique set of difficult problems, due to the fact that ink-jet inks must undergo the more intense physical forces involved in the jetting process, i.e. must be ink-jettable, and then assume the stationary characteristics of an applied ink. More particularly, prior to and during jetting, ink-jettable inks should have sufficiently low viscosity to allow for easy passage through an ink-jet pen orifice. The use of an ink-jettable ink exhibiting sufficiently low viscosity reduces the occurrence of several problems typically associated with ink-jet printing including necking, sputtering, and aerosol effect.

Subsequent to jetting, ink-jettable inks can have sufficiently high viscosity to allow for proper drying of the ink upon the substrate without ineffectively high incidences of problems often associated with ink-jet prints, e.g., bleeding, smearing, reduced optical density, and lack of resistance to water and other solvents. Because of the issues surrounding optimal latent and applied ink characteristics, when compared with other printing processes and inks, the formulation of an ink-jettable ink with optimal latent rheology is a more difficult balancing process where certain applied ink characteristics must almost certainly be sacrificed for latent rheology and vice versa.

Regarding the prior art, the need to balance and improve latent and applied ink characteristics and thereby increase print quality in printing processes (outside the ink-jet ink area) has lead to the use of radiation-initiated photopolymerizable ink compositions. These compositions and processes typically involve inks which contain a diarylsulfonium or triarylsulfonium salt as a photo-initiated catalyst. Subsequent to application, the ink is subjected to a radiation source, whereupon the photo-initiated catalysts create a strong BrØnsted acid that initiates a cationic polymerization.

In accordance with the present invention, no cationic polymerization occurs as is present in the prior art, because pre-polymeric materials are typically not present in ink-vehicles used with the present invention. Specifically, an ink-jettable ink is disclosed wherein, through the use of ink colorants whose solubility is pH dependent, a photo-initiated acid generator can be used to improve the applied characteristics of an ink-jettable ink. For example, an onium salt can be used to create, in situ, a strong BrØnsted acid when exposed to radiation, such as ultraviolet light. The modification of the ink solution pH from a base to an acid induces the ink colorant to become more insoluble and thereby increases the ink viscosity on the substrate. Through this energy induced insolubilization of the ink colorant, the ink composition may achieve effective latent rheology for use as an ink-jettable ink while using the photo-initiated acid generator to improve applied ink characteristics and the final print quality.

In one embodiment, an onium salt can be converted to a superacid in an aqueous solution according to the following reaction scheme:

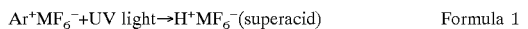

$Ar^+MF_6^- + UV\ light \rightarrow H^+MF_6^-$ (superacid)　　　Formula 1

In the above equation, Ar can represent the cation of an aryl onium salt such as triphenylsulfonium, the anion M can be phosphorus or antimony, and F is flourine. Formula 1 is given by way of example of an onium salt that will convert to a superacid upon exposure to radiation, particularly to ultraviolet light. Typically, the $H^+$ ion present in the superacid is supplied by the solvent, which can can be an aqueous solution. Other onium salts will react similarly with ultraviolet light or other forms of radiation, and can also provide acceptable results.

Examples of specific onium salt-containing compositions that can be used in accordance with this invention include, but are not limited to the following: Cyracure UVI-6992, Cyracure UVI-6990, and Cyracure UVI-6974, each available form Union Carbide, Linden, N.J., U.S.A.; and SarCat CD1010 and SarCatCD1011, each available from Sartomer, Exton, Pa, U.S.A.

The following structures are provide by way of example, to illustrate representative onium salts that can act as photo-initiators, according the principles of the present invention:

Formula 2

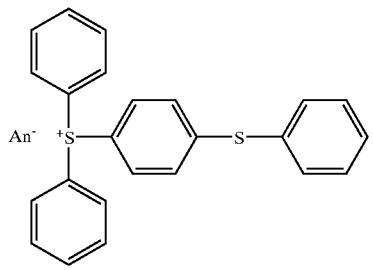

-continued

Formula 3

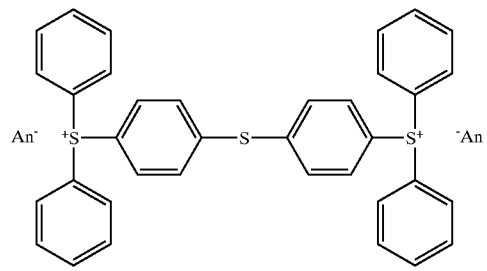

In Formulas 2 and 3 above, if An is $SbF_6^-$, then a formulation containing a mixture of Formulas 2 and 3 is available under the tradename Cyracure UVI-6974. If $An^-$ is $PF_6^-$, then a mixture of Formulas 2 and 3 is available as Cyracure UVI-6990.

Examples of effective ink colorants having pH dependent solubility that can be used in accordance with the present invention include, but are not limited to, the following: Pro-Jet Fast Black 2, from Avecia, Manchester, UK; Pro-Jet Fast Cyan 2 from Avecia, Manchester, UK; Pro-Jet Fast Magenta 2 from Avecia, Manchester, UK; Pro-Jet Fast Yellow 2 from Avecia, Manchester, UK; and Cab-O-Jet 300, from Cabot, Boston, Mass., U.S.A.

A method of printing an image on a substrate with increased print quality, water and smear fastness, and optical density can comprise the steps of formulating an ink-jettable ink composition, comprising an effective amount of an ink vehicle, an effective amount of an ink colorant having solubility properties that are pH dependent, and an effective amount of a photo-initiated acid generator, wherein the composition exhibits a decrease in pH upon exposure to radiation, followed by precipitation of the ink colorant; jetting the ink composition from an ink-jet pen onto a substrate; and exposing the ink-jetted ink on the substrate to radiation wherein the ink-jet ink composition exhibits reduced pH following exposure to radiation, followed by precipitation of the colorant. Any of the ink-jet ink composition variables described above can be used with the present method. In one embodiment, the radiation source can be an ultraviolet light source, and in another embodiment, the radiation source can be an electron beam emitter.

A system for printing an image on a substrate with increased ink efficiency can comprise an ink-jet ink pen containing an ink-jettable ink composition, comprising an effective amount of an ink vehicle, an effective amount of an ink colorant having solubility properties that are pH dependent, and an effective amount of a photo-initiated acid generator, wherein the composition exhibits a decrease in pH upon exposure to radiation, followed by precipitation of the ink colorant; a substrate configured for accepting a printed image from the ink-jet pen; and an energy source configured for irradiating the printed image such exhibits a decrease in pH is realized resulting in precipitation of the ink colorant. Again, any of the compositional variables described herein can be used. Further, the substrate can be paper and/or any other substrate known in the ink-jet ink arts.

While particular forms of the invention have been illustrated and described, it will be apparent that various modifications can be made without departing from the spirit and scope of the invention.

EXAMPLES

The following examples illustrate the embodiments of the invention that are presently best known. However, it is to be understood that the following compositions and exemplary studies are only illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

An ink-jet ink was prepared according to the following formulation:

15% by weight of 2-pyrrolidone;

40% by weight of diethylene glycol;

15% by weight dipropylene glycol;

0.15% by weight of 2,4,7,9-tetramethyl-5-decyne-4,7-diol;

0.75% by weight of the 3 ethoxylate derivative of 2,4,7,9-tetramethyl-5-decyne-4,7-diol;

1% by weight of Sodium hexadecyl diphenyloxide disulfonate;

6% by weight of Cyracure™ 6974 (Union Carbide);

4% by weight of a black pigment dispersant;

potassium hydroxide sufficient to adjust solution pH to 9.5; and balance of deionized water.

Example 2

An ink-jet ink was prepared as a control using the following formulation:

15% by weight of 2-pyrrolidone;

40% by weight of diethylene glycol;

15% by weight dipropylene glycol;

0.15% by weight of 2,4,7,9-tetramethyl-5-decyne-4,7-diol;

0.75% by weight of the 3 ethoxylate derivative of 2,4,7,9-tetramethyl-5-decyne-4,7-diol;

1% by weight of Sodium hexadecyl diphenyloxide disulfonate;

4% by weight of a black pigment dispersant;

potassium hydroxide sufficient to adjust solution pH to 9.5; and balance of deionized water.

Example 3

To demonstrate the reduction in pH exhibited after exposure to radiation by inks containing a photo-initiator in the form of an onium salt, the following test was conducted. An ink-jet ink was prepared according to Example 1 (containing about 6% by weight of an Cyracure 6974 (an onium salt) and about 4% by weight of a black pigment dispersant). A second ink-jet ink was prepared according to Example 2 (without the presence of Cyracure 6974). The ink-jet ink compositions were then each placed on a four inch diameter disk with a quartz plate cover and exposed to ultraviolet light sources (manufactured by Fusion UV System, Inc. and bearing the Model No. F450T) for four (4) seconds at maximum irradiance. The following results were recorded:

TABLE 1

| Solution | pH before UV exposure | pH after UV exposure |
|---|---|---|
| Example 1 Ink (w/ Cyracure 6974) | 9.2 | 2.9 |
| Example 2 Ink (w/o Cyracure 6974) | 9.6 | 9.2 |

As can be seen, the addition of a photo-initiated acid generator in the form of an onium salt significantly reduced the pH of the ink composition upon ultraviolet irradiation, causing the composition to change from a base to an acid.

Example 4

To demonstrate the increased precipitation of the ink colorant onto the substrate exhibited after exposure to radiation by inks containing ink colorants whose solubility is pH dependant and a photo-initiator in the form of an onium salt, the following test was conducted. An ink-jet ink was prepared according to Example 1 (containing about 6% by weight of an Cyracure 6974 (an onium salt) and about 4% by weight of a black pigment dispersant). A second ink-jet ink was prepared according to Example 2 (without the presence of Cyracure 6974). The ink-jet ink compositions were each placed on a four inch diameter disks with quartz plate covers and exposed to ultraviolet light sources (manufactured by Fusion UV System, Inc. and bearing the Model No. F450T) for four (4) seconds at the maximum irradiance. The following results were recorded:

TABLE 2

| Solution | Particle size before UV exposure | Particle size after UV exposure |
|---|---|---|
| Example 1 Ink (w/ Cyracure 6974) | 1.8 microns | 5.3 microns |
| Example 2 Ink (w/o Cyracure 6974) | 0.22 microns | 0.24 microns |

As can be seen, following exposure to a radiation source, the pigment particles in the ink composition containing a photo-initiated acid generator in the form of an onium salt exhibit an increase in size. This increase is indicative of the pH dependent solubility of the ink colorant and the precipitation of pigment particles which occurs as the solution pH is lowered subsequent to exposure to a radiation source.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

We claim:

1. An ink-jettable ink composition, comprising:
   a) an effective amount of an ink vehicle;
   b) an effective amount of an ink colorant having solubility properties that are pH dependent; and
   c) an effective amount of a photo-initiated acid generator, wherein said composition exhibits a decrease in pH upon exposure to radiation, followed by precipitation of the ink colorant.

2. An ink-jettable ink composition as in claim 1 wherein said photo-initiated acid generator is a BrØnsted acid generator.

3. An ink-jettable ink composition as in claim 1 wherein said photo-initiated acid generator is a Lewis acid generator.

4. An ink-jettable ink composition as in claim 2 wherein the BrØnsted acid generator is selected from the group consisting of an onium salt and an iodonium salt.

5. An ink-jettable ink composition as in claim 3 wherein the Lewis acid generator is a ferrocenium salt.

6. An ink-jettable ink composition as in claim 1 wherein said ink composition comprises at least 22% water by weight.

7. An ink-jettable ink composition as in claim 1 wherein after said decrease in pH, a momentary increase in viscosity occurs prior to precipitation.

8. An ink-jettable ink composition as in claim 1 wherein said ink-jettable ink composition exhibits a pH from about 7 to 13 prior to exposure to radiation and a pH from about 2 to 6 immediately following exposure to radiation.

9. An ink-jettable ink composition as in claim 4 wherein the onium salt is an arylonium salt.

10. An ink-jettable ink composition as in claim 9 wherein the arylonium salt is a triarylsulfonium salt.

11. An ink-jettable ink composition as in claim 4 wherein an anion of the onium salt is selected from the group consisting of $SbF_6^-$ and $PF_6^-$.

12. An ink-jettable ink composition as in claim 1 comprising from 0.05% to 4% solids by weight of the ink colorant, and from 0.1% to 13% by weight of the photo-initiated acid generator.

13. An ink-jettable ink composition as in claim 1 wherein the radiation is ultraviolet light.

14. An ink-jettable ink composition as in claim 1 wherein the radiation is provided by an electron beam emitter.

15. A method of printing an image on a substrate with increased print quality, water and smear fastness, and optical density, comprising:
   a) formulating an ink-jettable ink composition, comprising:
      i) an effective amount of an ink vehicle,
      ii) an effective amount of an ink colorant having solubility properties that are pH dependent, and
      iii) an effective amount of a photo-initiated acid generator;
   b) jetting said ink composition from an ink-jet pen onto a substrate; and
   c) exposing said ink-jetted ink on said substrate to radiation wherein said ink-jet ink composition exhibits reduced pH, followed by precipitation of the colorant.

16. A method as in claim 15 wherein the radiation is ultraviolet light.

17. A method as in claim 15 wherein the radiation is provided by an electron beam emitter.

18. A method as in claim 15 wherein said ink-jettable ink composition exhibits a pH from about 7 to 13 prior to exposure to radiation and a pH from about 2 to 6 immediately following exposure to radiation.

19. A method as in claim 15 wherein said photo-initiated acid generator is a BrØnsted acid generator.

20. A method as in claim 15 wherein said photo-initiated acid generator is a Lewis acid generator.

21. A method as in claim 19 wherein the BrØnsted acid generator is selected from the group consisting of an onium salt and an iodonium salt.

22. A method as in claim 20 wherein the Lewis acid generator is a ferrocenium salt.

23. A method as in claim 21 wherein the onium salt is an arylonium salt.

24. A method as in claim 23 wherein the arylonium salt is a triarylsufonium salt.

25. A method as in claim 21 wherein an anion of the photo-initiated acid generator is selected from the group consisting of $SbF_6^-$ and $PF_6^-$.

26. A system for printing an image on a substrate with increased ink efficiency, comprising:
   a) an ink-jet ink pen containing an ink-jettable ink composition, comprising:
      i) an effective amount of an ink vehicle,
      ii) an effective amount of an ink colorant having solubility properties that are pH dependent, and
      iii) an effective amount of a photo-initiated acid generator, wherein said composition exhibits a decrease in pH upon exposure to radiation, followed by precipitation of the ink colorant;
   b) a substrate configured for accepting a printed image from said ink-jet pen; and
   c) an energy source configured for irradiating said printed image such that a decrease in pH is realized resulting in precipitation of the ink colorant.

27. A system as in claim 26 wherein the substrate is paper.

28. A system as in claim 26 wherein said ink-jettable ink composition exhibits a. pH from about 7 to 13 prior to exposure to radiation and a pH from about 2 to 6 immediately following exposure.

29. A system as in claim 26 wherein said photo-initiated acid generator is a BrØnsted acid generator.

30. A system as in claim 26 wherein said photo-initiated acid generator is a Lewis acid generator.

31. A system as in claim 29 wherein the BrØnsted acid generator is selected from the group consisting of an onium salt and an iodonium salt.

32. A system as in claim 30 wherein the Lewis acid generator is a ferrocenium salt.

33. A system as in claim 31 wherein the onium salt is an arylonium salt.

34. A system as in claim 33 wherein the arylonium salt is a triarylsulfonium salt.

35. A system as in claim 26 wherein the radiation is ultraviolet light.

36. A system as in claim 26 wherein the radiation is provided by an electron beam emitter.

* * * * *

UNITED STATES PATENT AND TRADEMARK OFFICE
CERTIFICATE OF CORRECTION

| | |
|---|---|
| PATENT NO. | : 6,648,462 B2 |
| DATED | : November 18, 2003 |
| INVENTOR(S) | : Iu et al. |

It is certified that error appears in the above-identified patent and that said Letters Patent is hereby corrected as shown below:

<u>Column 10,</u>
Line 35, delete "a." and insert therefor -- a --.

Signed and Sealed this

Twenty-second Day of June, 2004

JON W. DUDAS
*Acting Director of the United States Patent and Trademark Office*